E. A. MACK.
LOCKING CAP FOR AUTOMOBILE RADIATORS.
APPLICATION FILED AUG. 3, 1920.
1,376,560.
Patented May 3, 1921.
2 SHEETS—SHEET 1.
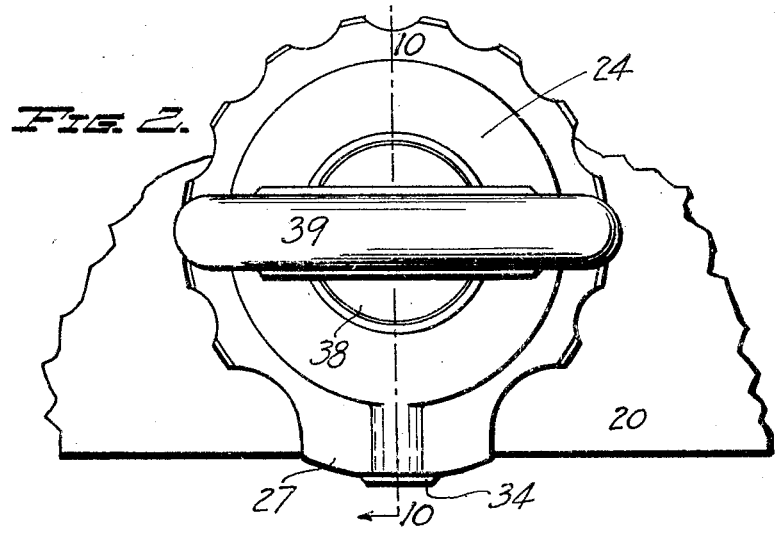
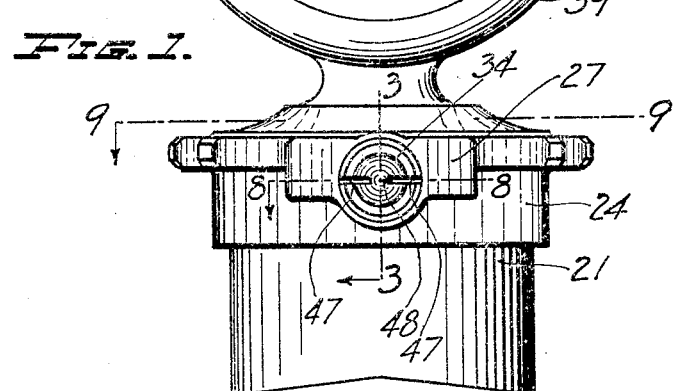
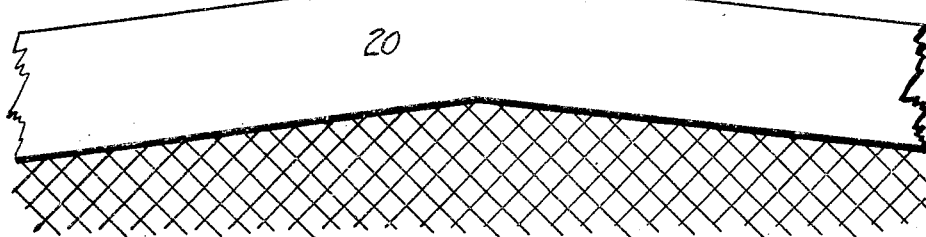
INVENTOR
E. A. MACK,
BY
ATTORNEY E. A. MACK.
LOCKING CAP FOR AUTOMOBILE RADIATORS.
APPLICATION FILED AUG. 3, 1920.
1,376,560.
Patented May 3, 1921.
2 SHEETS—SHEET 2
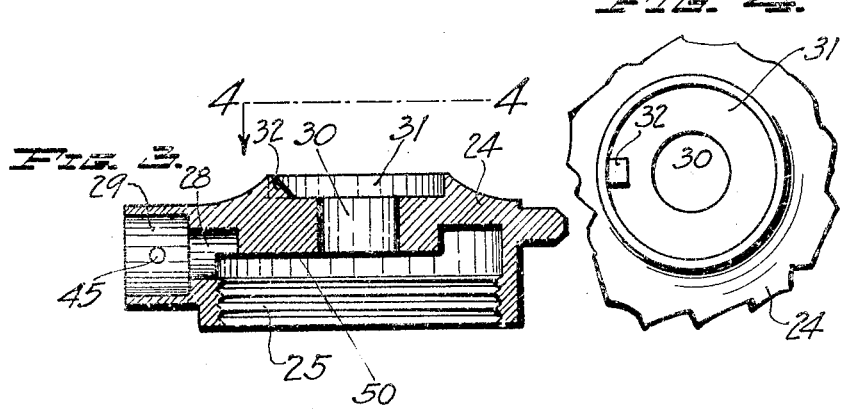
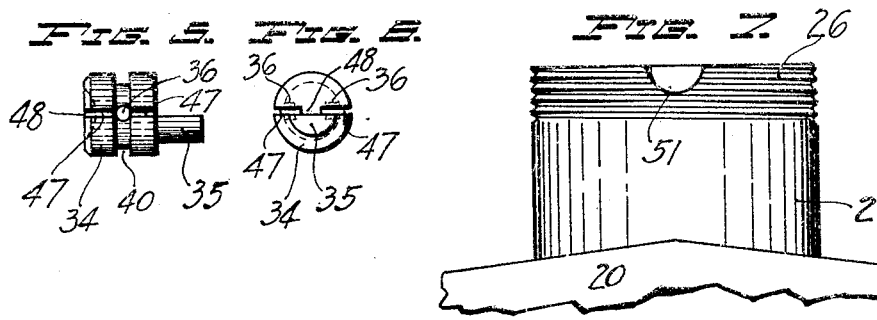
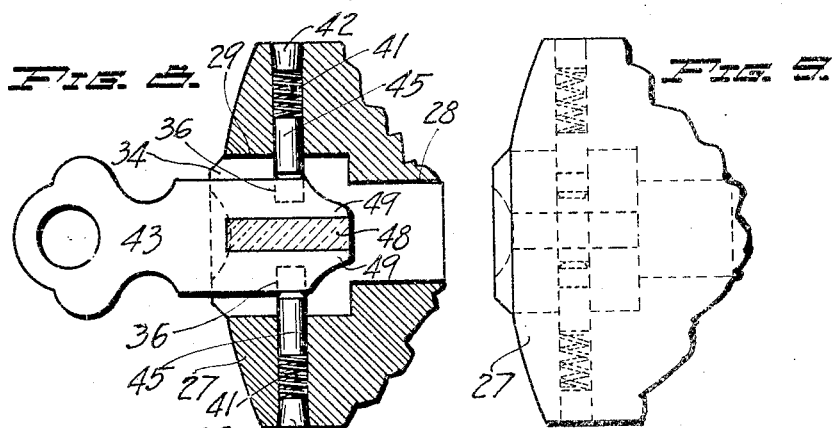
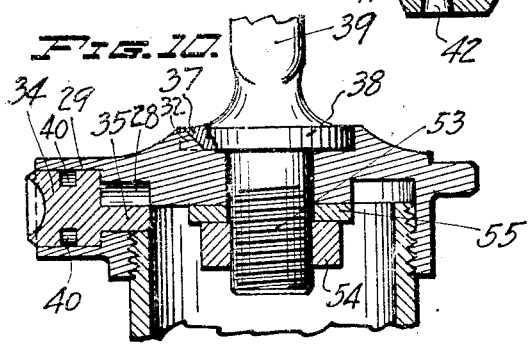
INVENTOR
E. A. MACK,
BY
ATTORNEY

UNITED STATES PATENT OFFICE.

EDWARD A. MACK, OF SALT LAKE CITY, UTAH.

LOCKING-CAP FOR AUTOMOBILE-RADIATORS.

1,376,560.　　　　Specification of Letters Patent.　　Patented May 3, 1921.

Application filed August 3, 1920. Serial No. 401,064.

*To all whom it may concern:*

Be it known that I, EDWARD A. MACK, a citizen of the United States, and a resident of Salt Lake City, the county of Salt Lake, and State of Utah, have invented a certain new and useful Locking-Cap for Automobile-Radiators, of which the following, together with the accompanying drawings, forms a full, clear, and exact specification, such as will enable others skilled in the art to which it appertains to make and use the same.

This invention relates to a locking cap for automobile radiators, and its principal objects are:

First. To provide a device for preventing temperature indicators, such as are commonly mounted on automobile radiator caps, from being stolen.

Second. To prevent unauthorized persons from tampering with the radiator cap of an automobile.

Third. To provide a device which shall consist of few parts, be economical in cost, durable in service and attractive in appearance.

In attaining these objects, I provide a cap comprising a body portion whose lower part is threaded and adapted to replace the ordinary radiator cap of an automobile. In the upper part of my improved cap is an opening for receiving the stem of a temperature indicator, and further, a counterbored recess for receiving the usual flange of the said temperature indicator. In the counterbored opening is a small rib or pin, which is adapted to fit into a corresponding notch or hole in the flange of the temperature indicator, so that when the latter is set down in place, it can not be rotated separately from the body portion of the cap. This rib or pin is preferably "blind", that is to say, located in such a manner that it shall be concealed from the outside when the temperature indicator is in place in the body portion. By tightening the threaded nut on the stem of the temperature indicator, the indicator may be securely locked in place with reference to the exterior of the cap.

In order to lock the cap to the radiator neck, a boss is provided on the front of the cap, this boss being bored to receive a cylindrical tumbler having an eccentrically protruding tongue on its inner end, which is adapted to be engaged in one position, by a notch in the top edge of the radiator neck. After the temperature indicator is fastened to the cap, the cap may be screwed down onto the radiator neck, to a point where the eccentric tongue will be engaged by the notch, so that the cylindrical tumbler, which may preferably be operated by a removable key, may be rotated one-half turn, thereby bringing the eccentric tongue portion down into the notch of the radiator neck, and thus prevent the unscrewing of the cap from the radiator neck, until the eccentric tongue portion is given another half-turn to again take it out of the notch in the radiator neck; this of course, can be accomplished only by means of the key and provides the security from theft, of the detachable parts described.

The features of this invention upon which the protection of Letters Patent is desired, are collectively grouped in the claims.

In the drawings,

Figure 1 represents a fragmentary elevation of the front of an automobile with one embodiment of this device in operative position thereon;

Fig. 2, a plan view thereof;

Fig. 3, a longitudinal vertical section taken on line 3—3 in Fig. 1, showing the body of the improved cap detached from other parts;

Fig. 4, a fragmentary plan, viewed from line 4—4 in Fig. 3;

Fig. 5, a side elevation of the tumbler separately;

Fig. 6, an end elevation thereof;

Fig. 7, a front elevation of the radiator neck, showing the notch therein for locking;

Fig. 8, an enlarged fragmentary horizontal section taken on line 8—8 in Fig. 1, and Fig. 9, a fragmentary plan corresponding to Fig. 8, and viewed from the line 9—9 in Fig. 1.

Fig. 10, a vertical center section, taken on line 10—10 in Fig. 2.

Referring to the drawings, 20 represents the front of an automobile radiator and 21 the threaded neck of the same. The body portion of the present device is shown at 24, in the lower part of which are the internal threads 25 (Fig. 3), adapted to engage the threads 26 at the top of the neck 21. From the front of the body 24 projects the laterally elongated boss 27, in which is formed a cylindrical bore 28 and the counterbore 29. In the top of the body 24, is a bored opening 30, having the counterbore 31, and at 32 there may be a small integral rib adapted to be engaged by a notched portion 37 in the flange 38 of the temperature indicator 39.

A tumbler 34 is adapted to fit into the counter-bore 29, and this tumbler has the protruding tongue 35, the latter having preferably the cross-sectional shape of approximately the half of a circular cylinder of a size adapted to fit rotatably into the bore 28. The tumbler 34 may have the annular groove 40, in the bottom of which, may be formed the depressions 36, for admitting the ends of the pins 45, the latter being under yielding pressure due to the action of compression springs 41, the springs being held in place by the tightly driven tapered plugs 42 (Fig. 8). The key 43 shown in Fig. 8, may have a width equal to the diameter of the tumbler at the bottom of the groove 40, so that, when the key is inserted, as shown, the tumbler may be freely rotated by means of the key. As soon as the key is brought into line with the pins, however, and is withdrawn from the tumbler, the pins 40 will be forced into the depressions 36 by the springs 41, thus producing the locking action. By again inserting the key in the slots 47, (Figs. 1, 5 and 6) straddling the neck 48 (see also Fig. 8) the points 49 of the key will force the pins outwardly into the position where the tumbler may be rotated. In order to afford greater security, the tumbler may be made of any standard designs such as are supplied by well known lock makers, the one employing the plain key shown in the drawing, being illustrated for the sake of simplicity.

When the cap 24 is screwed down on the radiator neck 21 to a point where the surface 50 (Fig. 3) touches, or nearly touches, the top of the radiator neck, then the bore 28 should register with the half-circular notch 51 (Fig. 7) of the radiator neck, as shown in the assembled form in Fig. 10.

It will be observed that the longitudinal axis of the tumbler 34 lies in the plane of the surface 50 and that the tongue 35 is eccentric with regard to the said axis, lying entirely on one side of the said plane. Therefore, the tumbler must be in the unlocked position, that is, above the surface 50, in order that the cap may be screwed down as above stated.

When the bore 28 comes into registry with the notch 51, the tumbler 34 may be given a half-turn, thereby bringing the tongue 35 down into the notch 51 and making it impossible to unscrew the cap from the radiator neck until the tongue 35 is again lifted out of the notch 51.

The temperature indicator 39 (Fig. 10) may be secured to my improved cap in the usual way, as shown, 53 being the depending threaded stem of the indicator and 54 a threaded nut bearing against the lock washer 55.

This device may be readily applied in connection with existing automobiles and existing temperature indicators, as it is only necessary to file a notch in the lower edge of the flange of the temperature indicator, to fit over the rib 32 (Fig. 4), and further, to file the half circular notch 51 (Fig. 7), in the radiator neck of the automobile for accommodating my improved cap as specified.

While a particular embodiment of this invention is herein described and illustrated, it is to be understood that the various parts thereof may, or may not, be represented in the preferred forms.

Therefore, the scope of the invention is to be interpreted from the claims in which its spirit is broadly generalized.

Having fully described my invention, what I claim is:

1. In a locking cap for automobile radiators, the combination of a threaded cap with an engaging threaded radiator neck having a circular cylindrical wall, a lateral face more or less plane and more or less perpendicular to the generating elements of the said wall, an indentation in the said lateral face, the said indentation extending from the inside surface to the outside surface of the said wall; a bored portion, having an axis, disposed in the said cap in such a manner that the said bored portion shall register with the said indentation in a certain angular position of the said cap relatively to the said radiator neck, while the said axis shall lie approximately in the plane of the said lateral face; a tumbler rotatably disposed in the said bored portion, and adapted to have a locked position and an unlocked position, the said tumbler having an axially halved portion, the said halved portion being adapted to lie without the said indentation and just above the said lateral face, in the unlocked position of the said tumbler; and further adapted to lie closely within the confines of the said indentation when the said tumbler is in the locked position; and means for locking the said tumbler.

2. In a locking cap for automobile radiators, a threaded cap, a radiator neck, an opening in its top surface, said opening extending downwardly and through wall of said neck; and having neck threads adapted to be engaged by the said cap threads, a tumbler rotatably disposed in the said cap and adapted to come into alinement with said neck opening, a tongue portion projecting inwardly from the said tumbler and lying on one side of the axis of said tumbler, the said tongue being adapted in its lowermost position, to lie within the confines of the said downwardly extending opening and further adapted in its upper position, to lie above the top surface of the said radiator neck, so that in rotating the cap relatively to the said neck, the tongue will pass over said top surface, and a locking mechanism for holding said tongue in said lowermost position at the will of the user.

3. A radiator externally threaded neck portion, having an annular wall terminating in a more or less plane, annular, lateral surface, the said neck portion being intersected by a half-circular cylindrical surface having its axis in the said plane and forming a gap in the said annular surface, an internally threaded cap adapted to be screwed down on the said neck portion, a tumbler rotatably disposed in the cap portion and in axial alinement with the said intersecting surface, a tongue projecting from the said tumbler, said tongue lying on one side of tumbler axis and parallel thereto, said tongue being adapted by a 180 degree movement of the said tumbler, to closely occupy the said gap and by an additional 180 degree movement to clear the annular surface of the said neck portion, and means for locking the said tumbler when the said tongue occupies the said gap.

In testimony whereof, I sign my name.

EDWARD A. MACK.